US007429349B2

(12) United States Patent
Maser et al.

(10) Patent No.: US 7,429,349 B2
(45) Date of Patent: Sep. 30, 2008

(54) METHOD OF PERFORATING A FLAT FILM BASED ON COLLAGEN

(75) Inventors: Franz Maser, Weinheim (DE); Oliver Tuerk, Weinheim (DE)

(73) Assignee: Naturin GmbH and Co., Weinheim (DE)

( * ) Notice: Subject to any disclaimer, the term of this patent is extended or adjusted under 35 U.S.C. 154(b) by 629 days.

(21) Appl. No.: 10/783,775

(22) Filed: Feb. 20, 2004

(65) Prior Publication Data

US 2004/0161500 A1      Aug. 19, 2004

Related U.S. Application Data

(63) Continuation of application No. PCT/IB01/01911, filed on Aug. 21, 2001.

(51) Int. Cl.
*B29C 67/00*      (2006.01)
(52) U.S. Cl. .................. 264/400; 264/482; 264/154; 426/140; 426/105; 426/415; 426/410
(58) Field of Classification Search ................. 264/400, 264/482, 154
See application file for complete search history.

(56) References Cited

U.S. PATENT DOCUMENTS

| 2,477,767 | A | | 8/1949 | Remer |
| 3,014,024 | A | | 12/1961 | Lieberman et al. |
| 3,779,285 | A | * | 12/1973 | Sinibaldo ................ 138/118.1 |
| 3,813,731 | A | | 6/1974 | Becker et al. |
| 3,917,862 | A | | 11/1975 | Bridgeford |
| 4,910,034 | A | | 3/1990 | Winkler |
| 4,923,608 | A | | 5/1990 | Flottmann et al. |
| 5,550,346 | A | * | 8/1996 | Andriash et al. ........ 219/121.72 |
| 5,736,180 | A | | 4/1998 | Peiffer et al. |
| 5,885,534 | A | | 3/1999 | Reynolds et al. |
| 5,885,634 | A | | 3/1999 | Areso |
| 6,224,919 | B1 | | 5/2001 | Maser et al. |

FOREIGN PATENT DOCUMENTS

| CA | 2 352 182 | 6/2000 |
| CA | 2352182 | 6/2000 |
| DE | 642 922 | 3/1937 |

(Continued)

OTHER PUBLICATIONS

International Search Report dated May 7, 2002.

(Continued)

*Primary Examiner*—Edmund H. Lee
(74) *Attorney, Agent, or Firm*—Notaro & Michalos P.C.

(57) ABSTRACT

The object of the invention is a multi-perforated collagen film provided on rolls or in the form of sheets, for use as a food wrapping in food industry, comprising perforations by means of laser of substantially circular shape with an average ellipticity of less than 0.17 and the holes being spaced with respect to their nearest neighbors by 3 mm to 14 mm, thus allowing the escape of air or steam trapped between the film and the food wrapped into said film, and said film still having sufficient mechanical strength and extensibility to be able to stand the food processing steps in the manufacture of cooked ham or in comparable operations under industrial conditions.

6 Claims, 17 Drawing Sheets

FOREIGN PATENT DOCUMENTS

| | | |
|---|---|---|
| DE | 642922 | 3/1937 |
| DE | 36 01 913 | 7/1987 |
| DE | 198 54 769 | 5/2000 |
| EP | 0845336 | * 10/1997 |
| EP | 0 845 336 | 6/1998 |
| FR | 2 074 070 | 10/1971 |
| GB | 1234358 | 6/1971 |
| WO | WO 95/04102 | 2/1995 |
| WO | 9517100 | 6/1995 |

OTHER PUBLICATIONS

Webster's Third New International Dictionary (3 pages).

Gerhard Effenberger "Skins for prepared meat product artificial casing: Manufacturing, Properties, Application" Fully Revised Second Edition.

* cited by examiner

Figure 1

| Sample code | average perforation diameter (μm) | approximate spacing between perforations in machine direction (mm) | spacing between perforations in transverse direction (mm) | approximate perforation density (perforations/m²) in perforated area | power (%) | puls frequency (kHz) | galvo speed (mm/s) | start positioning | wpa1 | gpa1 | delay1 | wpa2 | gpa2 | delay2 |
|---|---|---|---|---|---|---|---|---|---|---|---|---|---|---|
| 4/10/10 | 400 | 10 | 10 | 10 000 | 3 | 0.55 | 4000 | x=-4, y=-160 | x=4, Y=160 | x=-4, y=160 | 1 | x=4, y=-160 | x=-4, y=-160 | 1 |
| 4/10/20 | 400 | 10 | 20 | 5 000 | 1 | 0.26 | 4000 | x=-4, y=-160 | x=4, Y=160 | x=-4, y=160 | 50 | x=4, y=-160 | x=-4, y=-160 | 50 |
| 4/20/10 | 400 | 20 | 10 | 5 000 | 3 | 0.55 | 4000 | x=-4, y=-160 | x=4, Y=160 | x=-4, y=160 | 150 | x=4, y=-160 | x=-4, y=-160 | 150 |
| 4/20/20 | 400 | 20 | 20 | 2 500 | 1 | 0.26 | 4000 | x=-4, y=-160 | x=4, Y=160 | x=-4, y=160 | 150 | x=4, y=-160 | x=-4, y=-160 | 150 |
| 6/10/10 | 600 | 10 | 10 | 10 000 | 5 | 0.55 | 4000 | x=-4, y=-160 | x=4, Y=160 | x=-4, y=160 | 1 | x=4, y=-160 | x=-4, y=-160 | 1 |
| 6/10/20 | 600 | 10 | 20 | 5 000 | 2 | 0.26 | 4000 | x=-4, y=-160 | x=4, Y=160 | x=-4, y=160 | 30 | x=4, y=-160 | x=-4, y=-160 | 30 |
| 6/20/10 | 600 | 20 | 10 | 5 000 | 5 | 0.55 | 4000 | x=-4, y=-160 | x=4, Y=160 | x=-4, y=160 | 120 | x=4, y=-160 | x=-4, y=-160 | 120 |
| 6/20/20 | 600 | 20 | 20 | 2 500 | 2 | 0.26 | 4000 | x=-4, y=-160 | x=4, Y=160 | x=-4, y=160 | 150 | x=4, y=-160 | x=-4, y=-160 | 150 |
| 8/10/10 | 800 | 10 | 10 | 10 000 | 7 | 0.55 | 4000 | x=-4, y=-160 | x=4, Y=160 | x=-4, y=160 | 1 | x=4, y=-160 | x=-4, y=-160 | 1 |
| 8/10/20 | 800 | 10 | 20 | 5 000 | 3 | 0.3 | 4000 | x=-4, y=-160 | x=4, Y=160 | x=-4, y=160 | 1 | x=4, y=-160 | x=-4, y=-160 | 1 |
| 8/20/10 | 800 | 20 | 10 | 5 000 | 7 | 0.55 | 4000 | x=-4, y=-160 | x=4, Y=160 | x=-4, y=160 | 150 | x=4, y=-160 | x=-4, y=-160 | 150 |
| 8/20/20 | 800 | 20 | 20 | 2 500 | 3 | 0.3 | 4000 | x=-4, y=-160 | x=4, Y=160 | x=-4, y=160 | 150 | x=4, y=-160 | x=-4, y=-160 | 150 |

| Sample code | Air pockets after stuffing | Surface craters after cooking | Removal of the net | Additional remarks |
|---|---|---|---|---|
| Standard | partially palm sized air pockets | essentially all hams show surface craters with diameters of up to 10 cm | o.k. | |
| 8/20/20 | 15 % of the hams show air pockets with diameters ranging from 1cm to 4 cm | 10 % of the hams show surface craters, 6 % require downgrading | o.k. | essentially all hams show pronounced surface nipples |
| 6/10/10 | 2 % of the hams show small air pockets | essentially no surface craters which would require downgrading | o.k. | minor surface nipples, difficult to detect visually |
| 4/10/10 | 5 % of the hams show small air pockets | 3 % of the hams show surface craters; about 1-2 % require downgrading (border-line cases) | o.k. | practically no surface nipples |
| 2/10/10 | 15 % of the hams show big air pockets | 12 % of the hams show surface craters, 8 % require downgrading | o.k. | no surface nipples |

Figure 2

METHOD OF PERFORATING A FLAT FILM BASED ON COLLAGEN

OBJECT OF THE INVENTION

This application is a continuation of international application number PCT/IB01/01911, filed Aug. 21, 2001 and is still pending.

The object of this invention is a perforated collagen film in the form of rolls or sheets, suitable for wrapping food and, due to sufficiently low distances between the individual perforations, allowing the escape of air or steam trapped between the film and the food wrapped into said film, and having appropriate mechanical properties to be used in the manufacture of cooked ham or in comparable operations under industrial conditions.

BACKGROUND OF THE INVENTION

To meet the large demand for cooked ham it has become common to use other large muscle parts of the pig in ham manufacture, for instance, de-limbed shoulder and neck. These pieces of meat are packed into an elastic net prior to cooking. During cooking, the former pieces of meat turn into a compact netted ham with an appealing surface structure due to the netting imprint. In order not to damage the ham surface upon removal of the elastic net it has become common to introduce an edible collagen film between the net and the pieces of meat. In the course of the cooking process the collagen film becomes an integral component of the ham and the elastic net can easily be removed from the finished product without doing harm to the meat surface.

The preparation of edible collagen films has been described, for example, in DE 642 922 or DE 19970403. Their application as edible wrappings for food has been addressed, for instance, in DE 19 45 527 and their use in wrapping meat products is known from U.S. Pat. No. 3,014,024.

U.S. Pat. No. 5,885,634 teaches that the extensibility and the tear strength ("resistance") of a collagen film are key factors with respect to the machinability of collagen films. It also teaches how to improve their extensibility without compromising their resistance.

Collagen films with functional ingredients incorporated into the film are known from DE-PS 970 263 (film containing soluble colorants and/or soluble aroma components) and WO 95/17100 (collagen film with finely ground spices embedded as integral ingredients).

Also, an edible collagen film suitable to simplify the manufacturing process for "Black Forest Ham" or other foodstuffs with a black outer coating has been described (U.S. Pat. No. 6,224,919).

Thus, edible collagen films have found wide application in meat and poultry industry permitting more effective manufacturing processes and providing tastier and more appealing products.

Nowadays, collagen films are provided either on "rolls" (continuous film reeled on a cylindrical core; typical film lengths: 50 m or 100 m; typical film widths between 380 mm and 620 mm) or in the form of "sheets" cut to the dimensions required by the customer. A typical wall thickness of the films available ranges between 15 µm and 30 µm (when the film has a moisture content of 10%-15%). Preferably, the thickness of these films is not expressed in terms of "µm" but rather in terms of basis weight (g/m$^2$). For the currently available collagen films the basis weights range between 22 g/m$^2$ and 40 g/m$^2$ (at an absolute humidity of 10%-15%).

The most typical industrial application of collagen films is the manufacture of netted cooked hams addressed above. In general, rolls of edible collagen film are used on applicators similar to the ones addressed in U.S. Pat. No. 4,910,034. On such devices the film is pulled from the roll, guided over a forming shoulder and formed into a tubular film by loosely overlapping the edges of the flat film. The tubing thus obtained is guided through the annular channel between two concentric tubes at the end of which it meets a tubular elastic netting supplied from the outer tubing. In general, the sandwich-structured tubing formed by the elastic netting (outside) and the collagen film (inside) gets closed by means of a clip to cushion the pieces of meat which are delivered through the inner of the concentric tubes which serves as the stuffing tube. When the meat forced through the stuffing tube is cushioned at the end of the latter, it exerts a thrust on both the collagen film and the overlying elastic netting which, thus, are automatically enveloping the meat portion. After closing the sandwich-structured wrapping at the other end by means of a second clip, an ovoid netted product is obtained. This simplified description of the stuffing process is elucidated in more precision in U.S. Pat. No. 4,910,034.

However, despite of the advantages related with the use of edible collagen films exhaustively described, for example, in the patents cited before, one problem has always remained unsolved: air may become trapped between the collagen film and the meat in the course of the wrapping procedure and/or steam generated during subsequent cooking may do the same. As a consequence, air pockets may form, leaving unappetising "craters" on the surface of the finished product. Such products must then be downgraded, resulting in substantial loss of profit.

With the introduction of specific stuffing equipment (e.g. Handtmann-Piereder PX-94 NC) which permits higher productivity and more precise portioning than equipment used in the art before, the problem of air inclusion was recently observed to become even more pronounced and a solution to the problem had to be found urgently.

Various approaches have been made in the past to overcome this air pocket issue. One strategy still applied in today's practice is to manually puncture the netted product subsequent to the stuffing process. In a slightly different design of the same strategy, the stuffed product is either rolled over some kind of spike board or, in a more "semi-automatic" way, the filled netted product rolls down an inclined plain which is spiked. The punctures introduced into the collagen membrane allow the escape of trapped air or steam during the ensuing cooking process. However, in the course of puncturing, the delicate collagen film is observed to tend to split and frequently air pockets remain non-punctured.

From sausage casing industry it has been known for many years that using pre-punctured casings represents a more reliable solution than posterior puncture after stuffing (G. Effenberger, Wursthüllen—Kunstdarm, Herstellung—Eigenschaften—Anwendung, Hans Holzmann Verlag, Bad Wörishofen, 1991). Effenberger's publication referred to robust, non-edible tubular sausage casings which are known to be significantly more resistant than the fragile collagen flat films are. For that reason, puncturing of those casings did not require sophisticated perforation technologies like, for instance, laser or corona treatment.

The strategy of using a perforated product to solve the problem of air pocket formation in ham manufacture was addressed some years ago in EP 0 711 321 which suggests the use of a perforated collagen film. The patent teaches the larger the perforations are, the more they tend to reduce the strength of the collagen film to an unacceptable level. To avoid reduction of mechanical strength beyond an acceptable level, perforation should be arranged in a pattern which maximises the distance between adjacent perforations. Therefore, the perforated collagen film disclosed in EP 0 711 321 is perforated such that "each perforation is spaced 20 to 100 mm from its closest neighbour". In a preferred embodiment of that patent "the holes are spaced 30 to 90 mm apart in the longitudinal direction and 16 to 60 mm apart in the transverse direction". However, it was now observed that such a product would not fulfil industrial requirements, since in practice such distance between neighbouring perforations is not close enough to allow the trapped air to escape efficiently. This may be the reason why a product according to EP 0 711 321 has never solved the problem.

The idea of using a perforated product in ham manufacture was recently revived by promoting a non-edible flat film based on cellulose fibres, bearing an easy-peel coating on one side (product name SUN F, marketed by Unipac Packaging Products Ltd.). The most important feature of the film was its perforation and its machinability. Under the microscope the perforations looked irregularly shaped, which points to a mechanical perforation technology. The holes were spaced by about 10 mm from their nearest neighbours. The problem of air inclusion between the meat and the film was solved by this product, because the initially trapped air was able to escape through the perforation holes. However, due to its paper-like nature the film showed some other features in practice which made it fail. As the film was not edible, it had to be removed from the ham along with the netting. When the easy-peel-coating was not perfect, the film stuck to the meat and the surface of the product was disrupted. Even if the film performed perfectly in terms of avoiding air pockets and being reasonably peelable, the surface of the ham would still look little appealing for lack of surface gloss and due to the very weak netting imprint. This unsatisfactory netting imprint was a consequence of the limited film extensibility ("non-elasticity") which did not allow the film to smoothly fit the dome shaped surface protuberances generated by the tight-fitting net. On top of this, the surface of the meat was interspersed with macro and micro wrinkles caused by the stiffness of the paper-like product. This made the resulting hams look unattractive. Finally, the colour of the surface of smoked hams did not match the traditional colour of hams prepared in collagen films which the final customers are used to.

DESCRIPTION OF THE INVENTION

It has been observed now that distances between the perforations of 16 mm and higher are too large to allow the effective escape of air or steam trapped between the film and the piece of meat or poultry wrapped into said film, since apparently such air bubbles do not move so unhinderedly underneath the film as to easily "find" a perforation through which they could escape. Therefore, it is an objective of this invention to provide a mechanically resistant, perforated collagen film in which the perforations are spaced from each other in both machine and transverse direction by significantly less than 16 mm, more specifically by 3 mm to 12 mm.

It is another objective of this invention to introduce perforations which do not suffer from micro fissures or similar damages in their edges which could represent starting points of tear propagation. Therefore, perforation was carried out by means of laser technology.

However, surprisingly it was found that the mere use of laser technology does not automatically lead to perforated collagen films with mechanical properties which would allow to successfully use the product in industrial applications. Circular holes turned out to provide the perforated film with better mechanical properties than oval shaped perforations. It is, therefore, another objective of this invention to provide a perforated collagen film with holes, the ellipticity of which is less than 0.17, with the ellipticity being defined as "the difference between the equatorial and polar semi-diameters, divided by the equatorial" (Webster's Third New International Dictionary of the English Language, Volume I; Encyclopaedia Britannica, Inc., Chicago, Copyright© 1976 by G. & C. Merriam Co.).

As the size of the perforations should be such that negative side effects are avoided like getting easily plugged by the protein-loaded liquid on the surface of the meat or, on the other hand, allowing too much of such liquid to leak through the film, it is another objective of this invention to provide a perforated collagen film with perforations having average diameters (in the case of purely circular hole shape) or average lengths of their long axis (in the case of oval shaped holes) of 300 µm minimum and 800 µm maximum As theoretically one should avoid the generation of rows of perforations acting like the well-known easy-to-tear perforation lines used to separate labels from each other, it is another objective of this invention to provide a perforated collagen film with the two dimensional arrangement of the perforations being such that this arrangement does not represent a defined geometrical pattern but evades strict mathematical description.

As minimal mechanical characteristics are required from a perforated collagen film to stand the demands of industrial processing, it is a further objective of this invention to provide a product surpassing both in machine and transverse direction a minimal tensile strength and a minimal extensibility. As the minimal tensile strength of all samples successfully tested in the course of the present study was found to be 21 N/mm$^2$, it was decided to fix that value for the tensile strength. As the minimal extensibility of all samples successfully tested in the course of the present study was found to be 22%, it was decided to take that value for the extensibility. The particular importance of the extensibility of a collagen film has been addressed in the past in U.S. Pat. No. 5,885,534.

Finally, it is an objective of the invention to provide a perforated collagen film with a basis weight of 20 g/m$^2$ to 40 g/m$^2$ and an absolute humidity of 11% to 15% (weight/weight).

BRIEF DESCRIPTION OF THE FIGURES

To provide a complete description of the present invention and for a complete understanding of the characteristics of the invention, references made to the attached figures wherein:

FIG. 1: FIG. 1 presents a table listing the control parameters used to generate some specific samples of perforated collagen film with specific characteristics of the perforation.

FIG. 2: FIG. 2 presents a table showing the results of a test of perforated collagen films in the industrial manufacture of cooked ham. The samples differ in the size of the holes and in the spacing between the perforations.

FIG. 3 presents the microscopic picture of a hole resulting from mechanical perforation, showing the damages in the "corners" of the irregularly shaped quasi-oval holes which may act as starting points for tear propagation.

FIG. 4 presents a microscopic picture of a hole resulting from perforation by laser, showing the reinforced character of the edge of the hole as a result of the rampart formed by molten collagen.

FIG. 5 presents the "perforation loop" which illustrates movement of the laser beam during the perforation of the collagen film in a continuous operation.

FIG. 6 shows the irregularity of the arrangement of the perforations.

FIG. 7 is a graphic presentation of the frequency distribution of the ellipticities of the perforations found in the "6/10/10"—type sample prepared according to example 1.

FIG. 8 is a graphic presentation of the tensile strength in machine and in transverse direction of the non-perforated control and the "6/10/10"—type perforated sample prepared according to example 1.

FIG. 9 is a graphic presentation of the extensibility in machine and in transverse direction of the non-perforated control and the "6/10/10"—type perforated sample prepared according to example 1.

FIG. 10 is a graphic presentation of the tensile strength in machine and in transverse direction of a non-perforated control and some perforated samples differing in terms of the size of the holes and the spacing between the perforations.

FIG. 11 is a graphic presentation of the extensibility in machine and in transverse direction of a non-perforated control and some perforated samples differing in terms of the size of the holes and the spacing between the perforations.

FIG. 12 is a graphic presentation of the tensile strength in machine and in transverse direction of a non-perforated control and some perforated samples differing in terms of the size and the spacing between the perforations as well as the shape of the holes.

FIG. 13 is a graphic presentation of the extensibility in machine and in transverse direction of a non-perforated control and some perforated samples differing in terms of the size and the spacing between the perforations as well as the shape of the holes.

FIG. 14 is a graphic presentation of the tensile strength in machine and in transverse direction of a non-perforated control and some perforated samples differing in terms of the size and the spacing between the perforations, all samples being based on a film with lower basis weight.

FIG. 15 is a graphic presentation of the extensibility in machine and in transverse direction of a non-perforated control and some perforated samples differing in terms of the size and the spacing between the perforations, all samples being based on a film with lower basis weight.

FIG. 16 is a graphic presentation of the tensile strength in machine and in transverse direction of a non-perforated control and some perforated samples differing in the spacing between the perforations.

FIG. 17 is a graphic presentation of the extensibility in machine and in transverse direction of a non-perforated control and some perforated samples differing in the spacing between the perforations.

DETAILED DESCRIPTION OF THE INVENTION

The Laser Equipment

Figure 3:
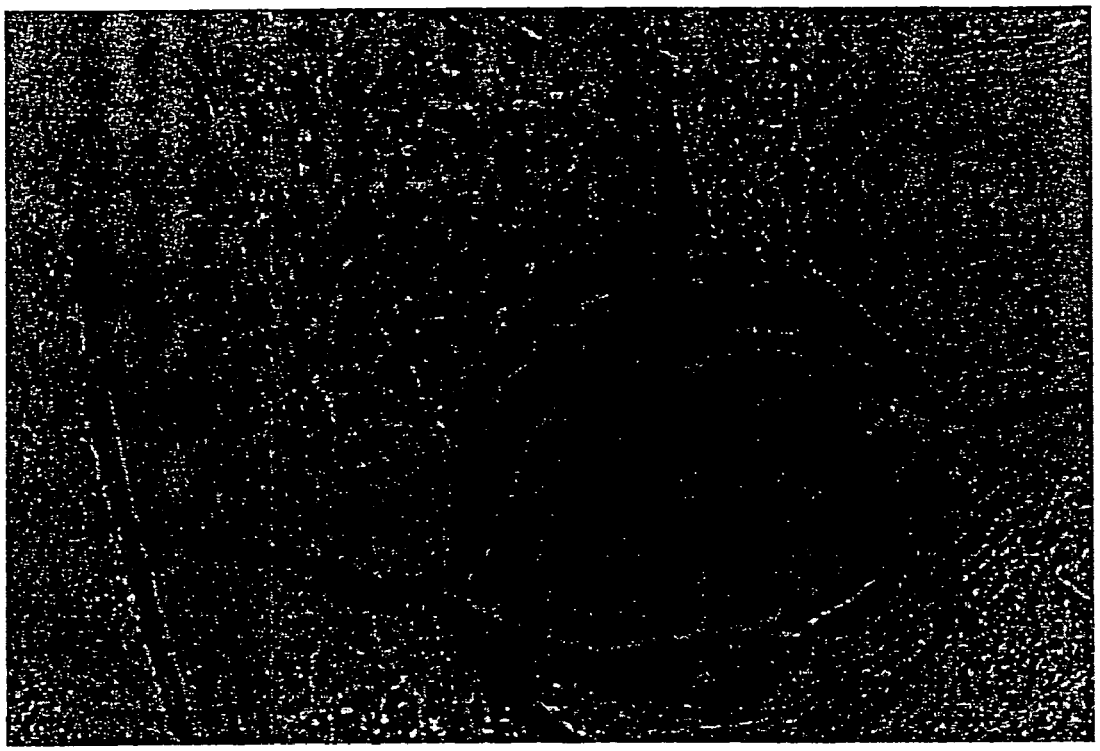
FIG. 3.

Two types of laser equipment were screened in the run-up to this study. One was a Coherent AVIA Model 355-1500 Nd:YAG solid-state laser and the other was a Coherent Diamond G-100 OEM $CO_2$ gas laser.

Though the "quality" of the perforations (as expressed in terms of the tensile strength and the extensibility of dumb-bell shaped specimen cut from the perforated film, see example 2) introduced with the Nd:YAG laser was found to be comparable to the one achieved with the $CO_2$ laser, the $CO_2$ laser was selected for this work mainly due to two reasons: with the Nd:YAG laser it took significantly longer to introduce a given number of perforations into the collagen film, which would be disadvantageous for a continuous perforation operation on industrial scale, and the Nd:YAG laser system tested was more expensive.

Perforating a film in a continuous process may be achieved, in principle, by using a laser equipped with an opto-mechanical unit which is programmed to deflect the laser beam in a defined way, or by moving the light source, e.g. perpendicular to the feeding direction of film, thus acting similar to a traditional plotter. It was decided to work with a pulsed $CO_2$ laser equipped with an aplanatic lens and an opto-mechanical device ("Galvo head") for laser beam deflection. Some other features of this laser are listed below:

Output power 100 W
Wavelength 10.2-10.7 μm
Pulse frequency 0-100 kHz
Peak effective power 250 W
Pulse energy range 5-200 mJ
Pulse rise and fall time <70 μsec
Beam ellipticity <1.3:1 (without beam correction, at laser output)
Beam diameter 1.8 mm±0.4 mm Perforation of Collagen Film Basically, collagen films may be perforated either on-line in the course of film manufacture, e.g. immediately before reeling, or off-line. For the studies disclosed below, the off-line variant was chosen in order not to interfere with standard film manufacture.

A roll of standard Naturin Collagen Food Film (Coffi®) was introduced into a re-reeling station. The laser source was installed with the laser beam essentially perpendicular to the film surface and the distance between the surface of the film and the laser output being such that the focus of the laser beam and the plane generated by the film coincided.

The opto-mechanical unit ("Galvo head") was programmed to generate defined hole sizes and distances between the perforations while the collagen film was re-reeled at a speed of 5 m/min. Perforation characteristics were described by the average diameter d of the perforations formed and by their approximate relative spacing m and t in machine and transverse direction. Thus, every perforation arrangement could be expressed by a code of the type "d/m/t". Typical arrangements generated reached from "2/10/10" (corresponding to "200 μm/10 mm/10 mm") via "6/3/3" "(corresponding to "600 μm /3 mm/3 mm") to "8/20/20" (corresponding to "800 μm/20 mm/20/mm). Another way of expressing such arrangements could be their presentation in terms of "perforation density" (number of perforations per square meter in the perforated area), which, however, disregards information on the size of the holes.

It was found out that the formation of circular perforations and the avoidance of oval holes is of utmost importance (see example 8) for the mechanical performance of the perforated collagen film. To achieve that goal, the speed of the opto-mechanical unit deflecting the laser beam, the laser power and the pulse frequency had to be carefully adjusted with respect to each other. Typical adjustments for some perforation arrangements can be found in FIG. 1.

An effective blower was installed to suck away the cloud of aerosol formed by the action of the laser beam on the collagen film.

Typically, not the complete film width was perforated in the course of the present study, but resulting collagen films were perforated such that a non-perforated margin remained at each of the edges of the film. The width of the non-perforated margins on the perforated film samples prepared varied between 2 cm and 8 cm. No significant influence of the width of the non-perforated margins on the application properties of the individual films could be detected.

Details of the manufacture of individual types of perforated collagen films are described in the examples.

Figure 4:
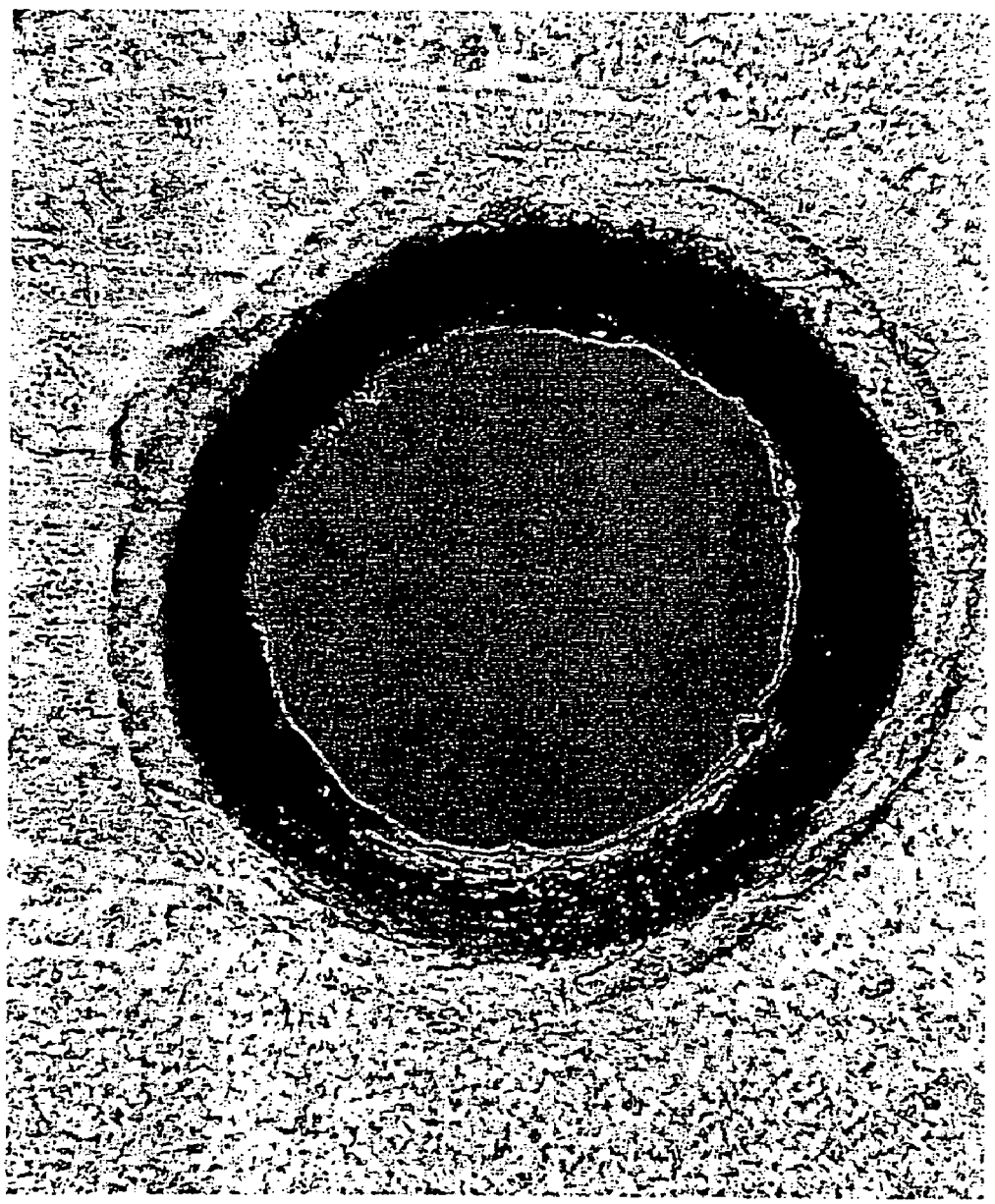
FIG. 4.

Provided the film humidity and the basis weight of the film are in the correct level of a standard non-perforated collagen film, the most important factor governing the mechanical performance of the perforated collagen film was found to be the quality of the perforations. For example, holes resulting from mechanical perforation (e.g. introduced by guiding the collagen film underneath a drum equipped with needles which rotates at the same speed as the film), tend to show damages in the "corners" of irregularly shaped quasi-oval holes (FIG. 3) which, in turn, represent starting points of tear propagation. In contrast, perforations introduced by laser are reinforced by a rampart of molten collagen (FIG. 4). This finding is in line with EP 0 711 321 which states that "using a laser beam to produce a perforation gives particularly good results". However, the studies presented below have revealed that the mere use of laser technology will not automatically lead to a product solving the problem of air pocket formation addressed under "2. Background of the invention". For instance, in the description of the invention according to EP 0 711 321, the closest spacing in transverse direction between neighbouring perforations is 16 mm, in machine direction the closest spacing mentioned is even larger (20 mm). Theoretically, this corresponds to a perforation density of 3125 perforations/$m^2$. In the claims of EP 0 711 321 the perforation density is even lower, as the closest spacing addressed is 20 mm, independent of the direction, which corresponds to 2500 perforations/$m^2$. Unexpectedly, it has now been found, that, for example, under the industrial manufacturing conditions described in example 7, such perforation density is not enough to efficiently release the air trapped between the meat and the film, as can be seen from FIG. 2.

On top of this finding it was surprising to learn about the key importance of the shape of the perforations (circular or oval) introduced into the collagen film. It was particularly surprising to learn that the transition from circular to oval perforations will mechanically weaken the collagen film much more than increasing the average diameter of circular holes. Details related with this finding can be found in example 8.

Yet another unexpected finding was the fact that, avoiding holes with pronounced oval shape by an appropriate programming of the laser parameters and, thus, generating approximately circular perforations, the spacing between the closest neighbours of the individual perforations can be reduced to 3 mm (which corresponds to a theoretical perforation density in the perforated area of 98 898 perforations/$m^2$) and the resulting perforated film still has sufficient mechanical strength and extensibility to stand the standard test mimicking industrial application (see example 2). Up to now it has been the state of the art to avoid perforation densities higher than 3 125 perforations/$m^2$ on perforated collagen films (EP 0 711 321), which corresponds to a spacing of 16 mm in transverse direction and 20 mm in machine direction between a perforation and its nearest neighbour.

Finally, it was an unexpected finding that, using the experimental set-up presented in this study and adjusting the laser parameters in the appropriate way, even when the distance between the nearest neighbours of individual perforations was lowered to only 3 mm (corresponding to 98 898 perforations/$m^2$ in the perforated zone) it is possible to manufacture a film with a level of mechanical resistance and extensibility which makes it suitable for industrial application, although the arrangement of the perforations do not obey a well-defined two-dimensional pattern as recommended in EP 0 711 321 ("Preferably, a diamond pattern is employed in which the holes in adjacent rows are staggered with respect to each other").

The procedure of wrapping a piece of meat (or poultry) with a collagen film, using typical industrial stuffing equipment, requires a minimum level of mechanical resistance and extensibility of the film in both machine direction (as during stuffing the film is unwound jerkily from the roll) and transverse direction (as the film has to stand the delivery of the meat or poultry through the stuffing tube and the subsequent plumping carried out to improve the shape of the netted product prior to cooking). Therefore, regardless of the direction considered, there will be lower limits with respect to the tensile strength and the extensibility of the film which have to be surpassed to yield a film suitable for industrial application. From the experimental data accumulated in the present study, it was concluded that the tensile strength of the collagen film should be equal to or exceed 21 N/$mm^2$ in any direction and, at the same time, the extensibility should exceed 22% in any direction (these data refer to a film with a water content of 11% to 15%).

EXAMPLES

The invention is further illustrated in more detail by means of examples which are related with the manufacture of different laser perforated collagen films, the characterisation of said films, their application in meat industry and the products produced in said collagen films. Though, for simplification, the examples dealing with industrial application exclusively refer to the manufacture of cooked ham, the application of the perforated collagen films according to this invention is not limited to that application.

In the first example the perforation of a collagen film by laser is described. The example also gives insight into the geometric arrangement of the perforations in the resulting perforated collagen film. The perforation "pattern" is found to be completely irregular with respect to the two-dimensional distribution of the holes.

Example 2 presents descriptions of the tests carried out with perforated collagen films (microscope; tensile testing machine; applicator mimicking industrial application of collagen films), as well as the results obtained with a film manufactured according to example 1.

The examples 3, 4 and 5 refer to the laser perforation of specific collagen films (black coloured film, caramel coloured film and an acidic variant of the standard collagen film), as well as the results obtained in the applicator test.

Example 6 describes the manufacture of perforated collagen films differing in the average size of the perforations as well as in the average spacing between the individual holes. Moreover, the results on the tensile strength and extensibility of the different samples is discussed.

Example 7 refers to a test of different perforated collagen films in industrial ham manufacture using particularly demanding stuffing equipment. The film samples differ with respect to the average size of the perforations as well as the average spacing between the individual holes. From the results obtained and summarised in FIG. 2 conclusions are drawn with respect to suitable hole diameters and the spacing between the perforations required for the efficient escape of air or steam trapped between the film and the meat.

Example 8 presents a comparison of films with oval shaped perforations and films having basically circular holes. The impact of the shape of the perforations on the mechanical characteristics of a perforated collagen film is shown to be much more pronounced than that of the size of the holes.

Example 9 refers to perforated collagen films derived from a film with low basis weight. From the results obtained by testing these samples it is concluded that, in principle, it will be possible to manufacture perforated collagen films with a basis weight as low as 20 g/m².

Example 10 presents results obtained from testing perforated collagen films having very low distances between the individual perforations. The results show that a film with perforations being only spaced 3 mm apart from their nearest neighbours is still able to pass a standard quality test.

Example 11 describes the application of collagen sheets in the manufacture of cooked ham. Results obtained using non-perforated sheets are compared to results obtained when perforated sheets of collagen film are used.

DETAILED DESCRIPTION OF THE EXAMPLES

Example 1

Manufacture of a Laser Perforated Collagen Film by Means of a $CO_2$ Laser

A 100 m roll of 38 cm wide standard Naturin collagen food film (Coffi®) as manufactured by Naturin GmbH & Co., Weinheim, Germany, having a pH of 4.7 and a basis weight of 29 g/m², was perforated by means of a $CO_2$ laser (Coherent Diamond G-100 OEM).

A typical composition of the film is as follows (% refers to weight/weight):

| | |
|---|---|
| collagen: | 67% |
| water: | 13% |
| humectants (glycerol + sorbitol): | 15% |
| acetoglycerides: | 4% |
| ash (600° C./5 h): | 1% |

A 32 cm wide central corridor of the film was perforated, leaving non-perforated margins with a width of 3 cm each. Perforation characteristics, as described by the average diameter d of the perforations formed and by their approximate relative spacing m and t in machine and transverse direction ("d/m/t"), followed the code "6/10/10" (corresponding to "600 μm /10 mm spacing between the holes in machine direction/10 mm spacing between the holes in transverse direction). Thus, the theoretical perforation density achieved in the perforated area was 10 000 perforations/m². Perforation was carried out at a film feeding speed of 5 m/min.

The relevant laser parameters were selected as follows:

| | | |
|---|---|---|
| power: | 5% | |
| pulse frequency (gpf): | 0.55 kHz | |
| Galvo speed: | 4000 mm/s | |
| start positioning: | "x-4"; "y-160" | |
| perforation loop: | wpa (draw line to): | "x = 4; y = 160" |
| | gpa (go inactive to): | "x = −4; y = 160" |
| | delay (ms): | 1 |
| | wpa (draw line to): | "x = 4; y = −160" |
| | gpa (go inactive to): | "x = −4; y = −160" |
| | delay (ms): | 1 |

Figure 5:
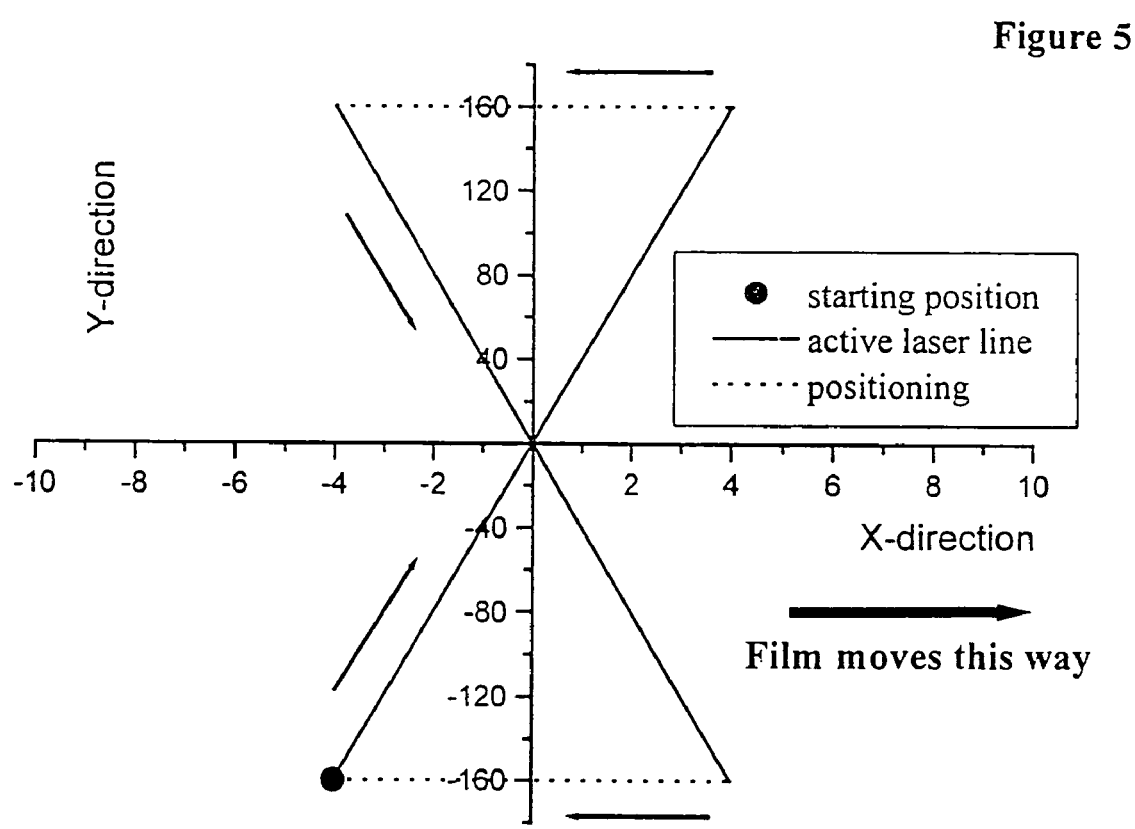
FIG. 5.

A schematic presentation of the perforation loop carried out by the laser beam is given in FIG. 5.

The aerosol formed as a result of the interaction between the laser beam and the collagen film was sucked off by means of an effective blower.

In the course of the perforation step, the film humidity dropped from 13.5% to 12.9%. The film was packed into a plastic bag which was sealed to avoid loss of moisture.

Figure 6:
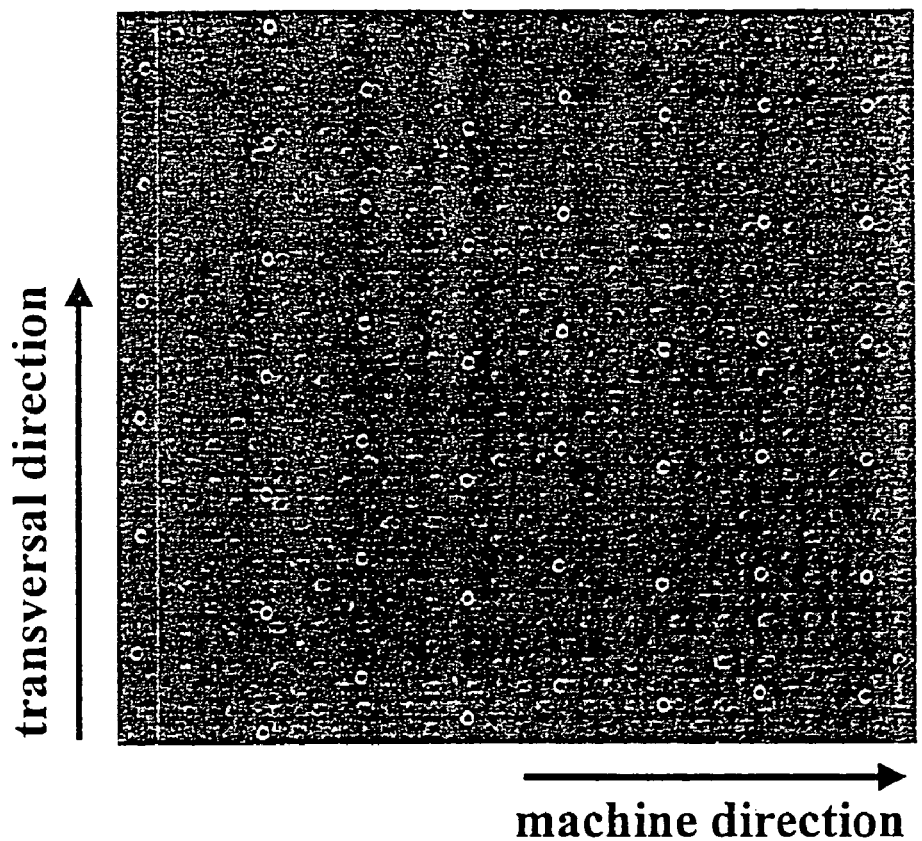
FIG. 6.

A closer look at the geometric distribution of the perforations generated by means of the experimental set-up used revealed that the "pattern" evades strict mathematical description. While in transverse direction the perforations are equidistant, the distance between two essentially parallel rows with transverse orientation varies, and in machine direction the position of the individual perforations fluctuates around straight lines (FIG. 6). Thus, in a two-dimensional consideration, the geometric distribution of the perforations is completely irregular with the only principle of strict order being in one dimension: the equidistant spacing between the perforations along a transverse row of perforations.

The generation of this irregular perforation arrangement is a consequence of the hardware design of the electronic control of the laser. The pulse frequency of the laser is provided by an oscillator which oscillates "freely", (i.e. without synchronisation) with the frequency given by the software command gpf (see above). The time between the execution of two software command lines, however, is not constant. As there is no synchronisation of the pulse frequency of the oscillator (generating the laser pulses) with the movement of the Galvo head, there is no defined position of the first hole in a defined row of perforations.

Therefore, there is admittedly always a defined starting point for the active perforation line (a point in space given by the command wpa, in our case x=160; y=4), but due to lack of synchronisation with the oscillator there is no defined point in time (starting time) and, therefore, no defined position of the first perforation in a given transverse row of perforations.

Example 2

Test of the Laser Perforated Collagen Film Manufactured According to Example 1

Figure 7:
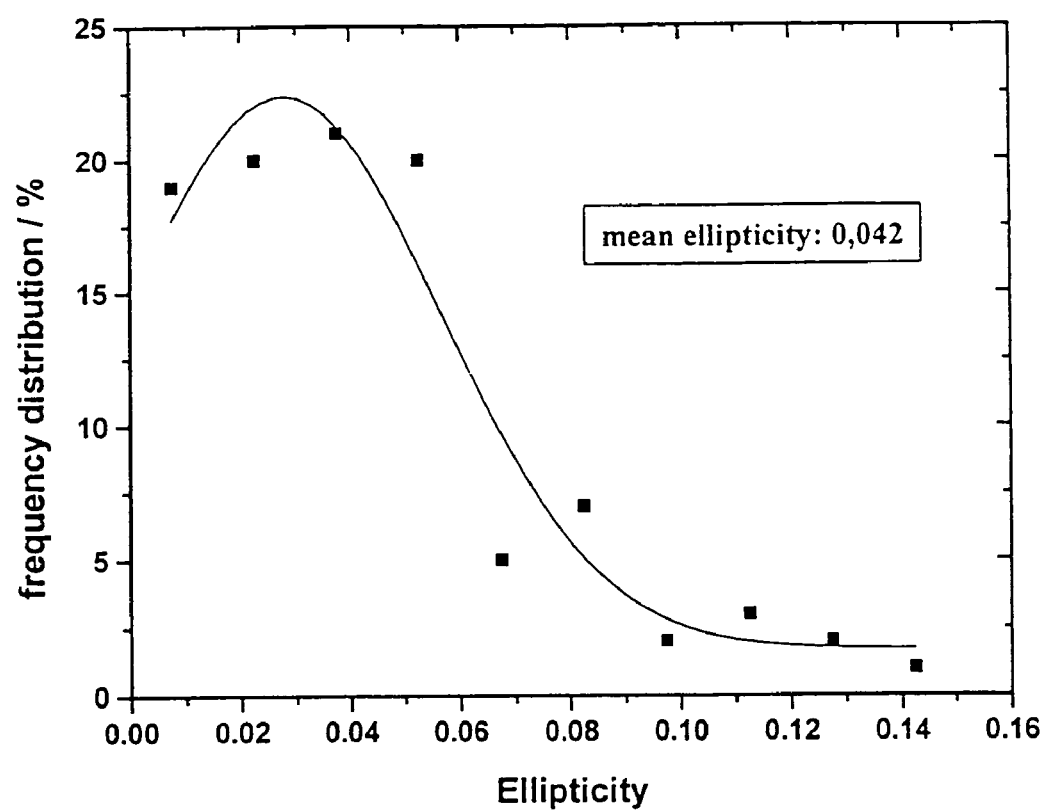
FIG. 7.

Under the microscope 50 perforations were evaluated with respect to their size and their shape. The perforations were found to be essentially circular, showing an average ellipicity of 0.042 (see FIG. 7). The mean value of the diameters was 620 μm with a standard deviation of 50 μm.

Figure 8:
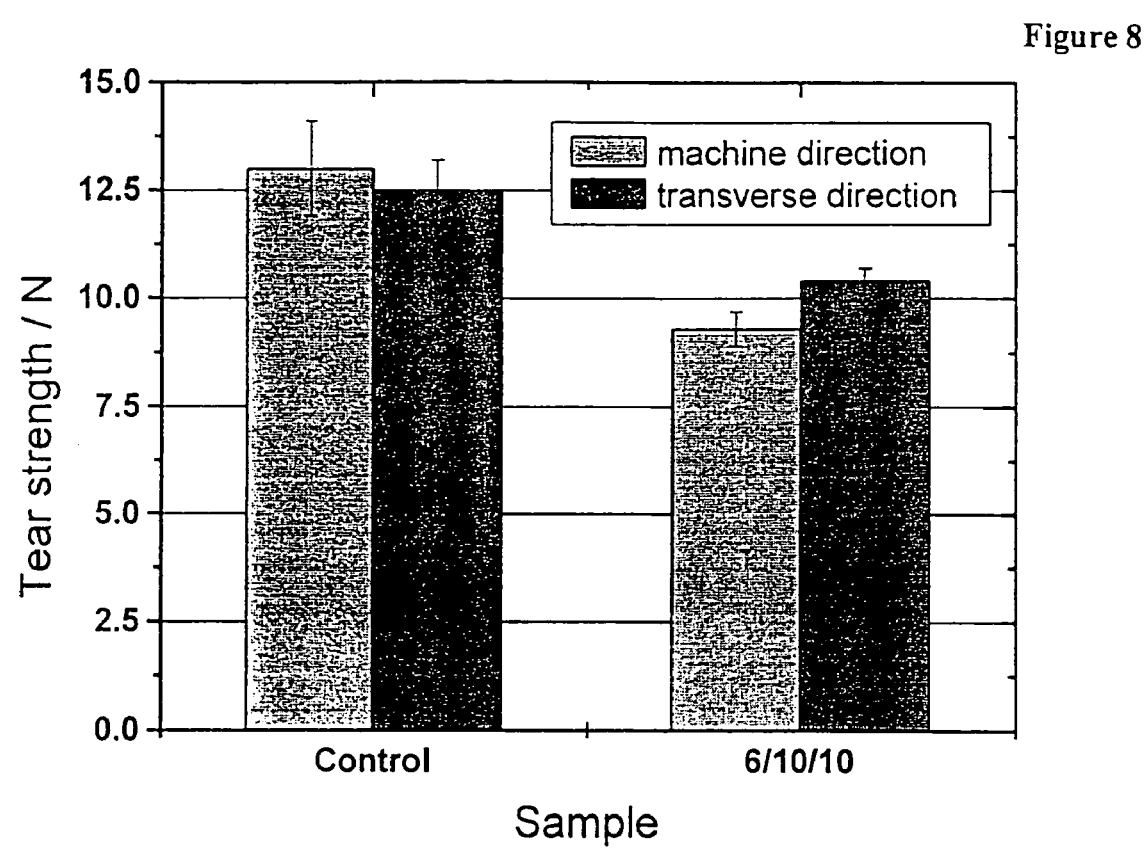
FIG. 8.
Figure 9:
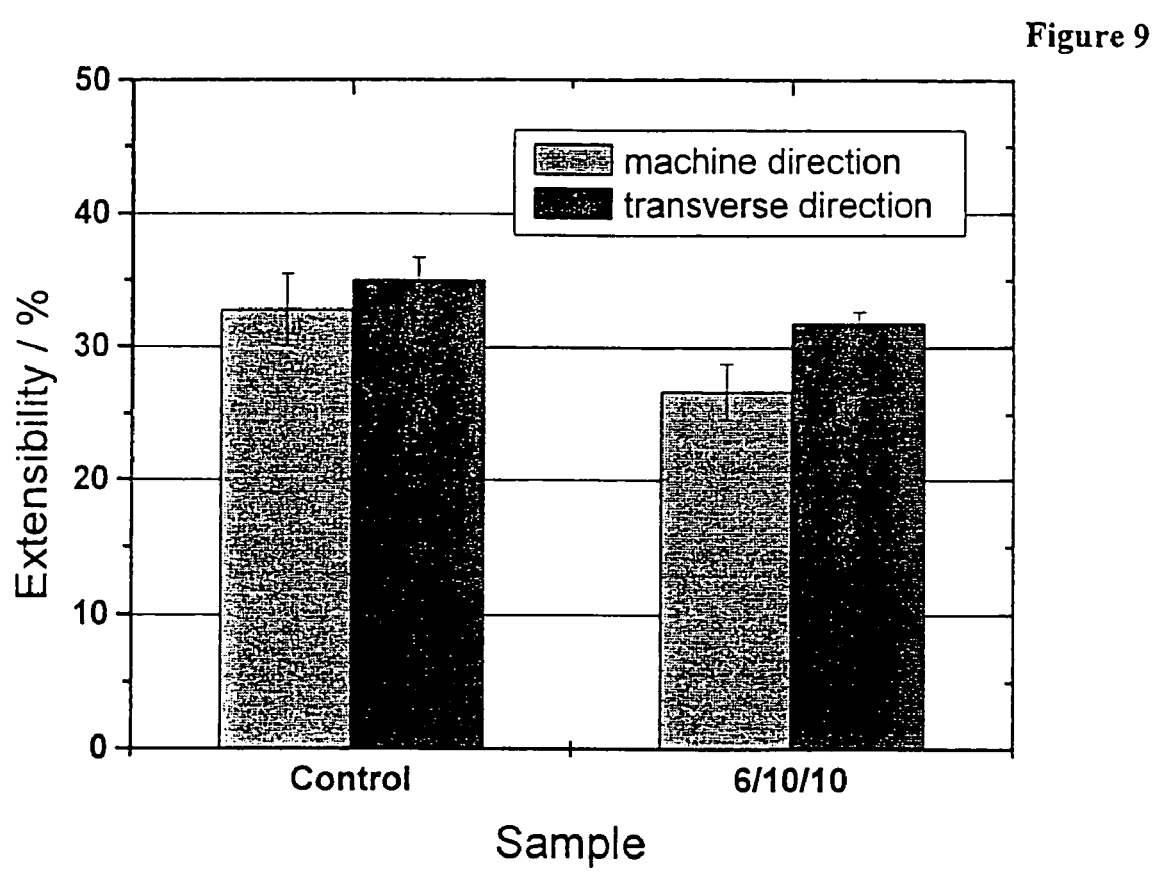
FIG. 9.

Dumb-bell shaped pieces (total length 11.6 cm, width of the narrow parallel portion 15 mm, width at ends 25 mm) of the film manufactured according to example 1 and its non-perforated version were punched from the films both in machine direction and in transverse direction. The tensile strength and extensibility of the dumb-bell shaped specimen were measured at 21° C./60% r.h. on a UTS tensile testing machine 3/205 (UTS Testsysteme GmbH, D-89079 Ulm-Einsingen, Germany). The speed of testing is 100 mm/min. The average number of perforations in the narrow parallel portion of the test specimen of the perforated film was 6. Test specimen were conditioned for 2 hours at 21° C./60% r. h. before testing. 10 specimen of each individual film sample were measured. Tensile strength was defined as the force required to rupture the test specimen, divided by the unit area of the original cross-section of the test specimen in its narrow parallel portion. Extensibility was defined as the extension at the point of film breakage. Results obtained are shown in FIGS. 8 and 9.

A 100 m roll of a film manufactured according to example 1 was loaded on the Naturin Coffi-A applicator to mimic industrial application. The test followed the Naturin working instruction PAKO0031, according to which the collagen film is jerkily unwound from the cardboard hub of the roll. As a consequence of the excellent correlation between this test and the film performance in industrial reality, this test is a Naturin-internal standard test carried out to control the quality of Coffi® production, following a defined sampling plan. Only material which shows no breakage in this test fulfils the requirements to be released for sale.

The perforated collagen film manufactured according to example 1 passed the test without tearing.

Example 3

Manufacture and Application Test of a Laser Perforated Black Collagen Film

A 100 m roll of 47 cm wide standard Naturin black collagen film as manufactured by Naturin GmbH & Co., Weinheim, Germany, having a pH of 4.5 and a basis weight of 31 g/m$^2$, was perforated as described in example 1. A 32 cm wide central corridor of the film was perforated, leaving non-perforated margins with a width of 7.5 cm on each side. The arrangement of the perforations followed the scheme "6/10/10".

The resulting perforated black collagen film was loaded on the Naturin Coffi-A applicator to mimic industrial application. The perforated black collagen film passed the test without tearing.

Example 4

Manufacture and Application Test of a Laser Perforated Caramel Coloured Collagen Film A 100 m roll of 57 cm wide standard Naturin caramel coloured collagen film as manufactured by Naturin GmbH & Co., Weinheim, Germany, having a pH of 4.8 and a basis weight of 32 g/m$^2$, was perforated in a way similar to the one explained in example 1. In a first run, a 26 cm wide corridor of the film was perforated, the left edge of the corridor being spaced 2.5 cm from the left edge of the film. In a second run, another 26 cm wide corridor of the film was perforated, the right edge of this corridor being spaced 2.5 cm from the right edge of the film Thus, the resulting film had non-perforated margins with a width of 2.5 cm on each side. The arrangement of the perforations followed the scheme "6/10/10".

The resulting perforated caramel coloured collagen film was loaded on the Naturin Coffi-A applicator to mimic industrial application. The perforated product passed the test without tearing.

Example 5

Manufacture and Application Test of a Laser Perforated Acidic Collagen Film

A 100 m roll of 47 cm wide non-neutralised collagen film having a pH of 2.8 but, with respect to its chemical composition, corresponding to the film of example 1, was perforated as described in example 1. The basis weight of the film was 29.5 g/m$^2$. A 32 cm wide central corridor of the film was perforated, leaving non-perforated margins with a width of 7.5 cm on each side. The resulting perforated non-neutralised collagen film was loaded on the Naturin Coffi-A applicator to mimic industrial application. The perforated acidic collagen film passed the test without tearing.

Example 6

Figure 10:
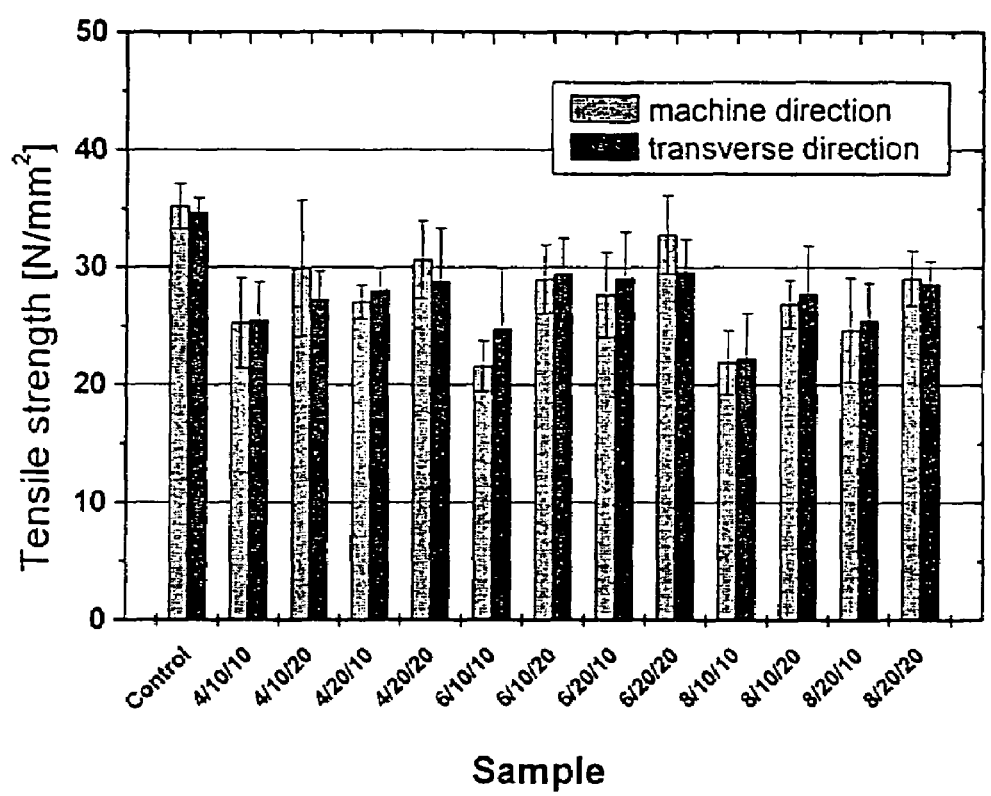
FIG. 10.
Figure 11:
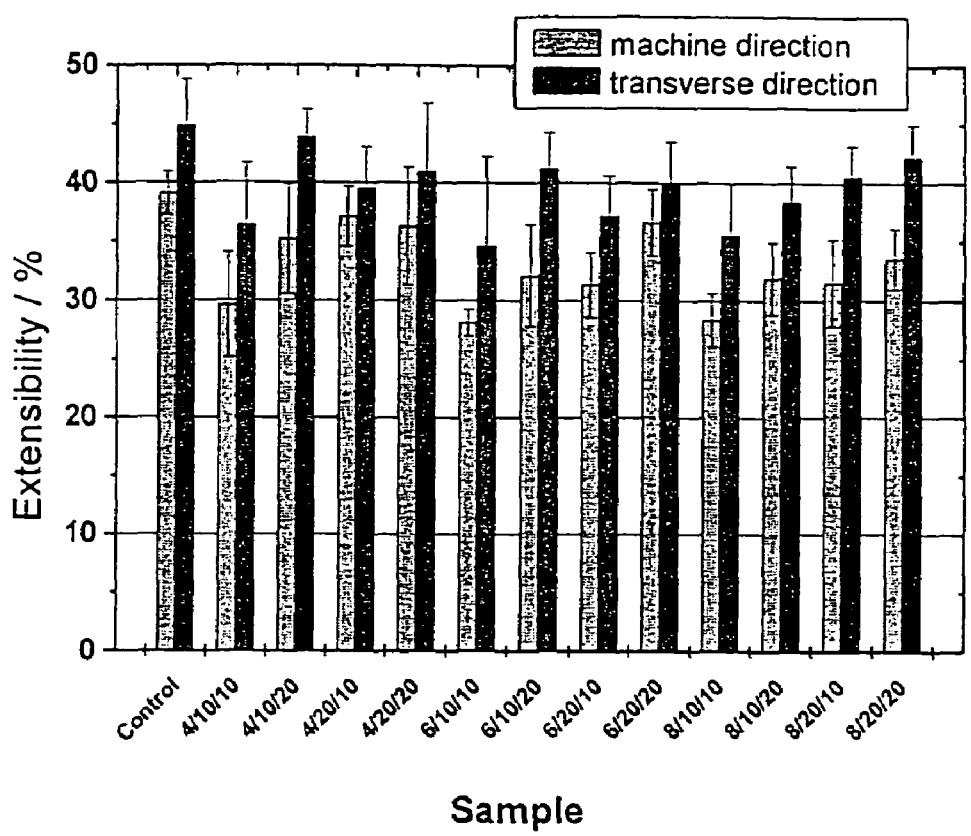
FIG. 11.

Manufacture and Test of Perforated Collagen Films Differing with Respect to the Average Size of the Perforations as Well as the Average Spacing Between the Individual Holes 100 m rolls of 47 cm wide standard Naturin black collagen film as manufactured by Naturin GmbH & Co., Weinheim, Germany, having a pH of 4.5 and a basis weight of 31 g/m$^2$, were perforated essentially as described in example 1, however obeying different arrangements of the perforations. Batch number, production line and manufacturing date of all rolls were identical. A 32 cm wide central corridor of the films was perforated, leaving non-perforated margins with a width of 7.5 cm on each side. Table 1 provides an overview over the samples prepared and the Laser parameters adjusted to obtain the intended samples:

The tensile strength of dumb-bell-shaped samples cut from the individual products and from a non-perforated control sample were studied on a tensile testing machine as explained in example 2. The results can be found in FIGS. 10 and 11.

As seen before and as expected, the tensile strength and the extensibility of the perforated samples are on a lower level than the corresponding parameters of the non-perforated ones. Clearly, along with increasing perforation density the mechanical strength and the extensibility of the film decreases. The measurements also show that the impact of the distance between neighbouring perforations is more pronounced than that of the diameter of the perforations. Thus, for example, the tensile strength of the sample coded "8/10/10" is not dramatically lower than that of the sample coded "4/10/10", but the tensile strength of "x/10/10"—type samples is always clearly lower than that of the corresponding "x/20/20"—type samples (x=4 and x=8).

Example 7

Test of Perforated Collagen Films in the Industrial Manufacture of Hams

Non-perforated standard Coffi® as well as selected samples of perforated collagen films produced as described in example 6 were tested in industrial ham manufacture. The perforated material tested was characterised by the following codes: "8/20/20"; "6/10/10"; "4/10/10"; "2/10/10". The "2/10/10"—type sample was not based on the same film batch as the other samples.

The stuffing equipment used was a Handtmann-Piereder PX-94 NC portioner in conjunction with the Handtmann-Piereder HVF 90 filler, as this combination is more demanding than other stuffing equipment with respect to air or steam inclusion between the meat an the film. The meat prepared for stuffing was pumped with 60% of brine (based on meat weight). The weight of the hams after stuffing corresponded to a mass of 2.1 kg. Stuffing speed was about 8 portions/min. None of the products stuffed in the course of the test was manually punctured after stuffing. With the non-perforated film only about 30 sample hams were stuffed to limit the number of downgraded finished products. With each of the perforated film types at least 250 hams were stuffed for evaluation. The products obtained were assessed immediately after stuffing and, a second time, after cooking. Results are summarised in FIG. 2.

The test shows that when standard non-perforated collagen film is used, posterior manual puncturing is a must to avoid downgrading for surface craters of essentially all hams manufactured. In standard ham manufacture, even despite manual puncturing after stuffing, the average level of downgraded product is in the range of 6% when non-perforated collagen film is used along with the Handtmann-Piereder PX-94 NC portioner.

From the results compiled in FIG. 2 following three conclusions can be drawn:
1. The diameter of the perforations must not be too small to allow the trapped air to escape. Obviously, perforations with a diameter of 200 μm get partially plugged by the protein containing liquid present on the surface of the meat in the moment of stuffing.
2. The diameter of the perforations must not be too wide to avoid undesired weight loss and the formation of protein nipples on the surface of the finished ham because of protein containing liquid leaking through the perforations. This negative effect will become more and more pronounced if the consistency of the meat to be stuffed is "soupier" due to higher degree of brine pumping. Diameters of 800 μm to represent the upper limit.
3. The perforation density must not be too low. A distance of 20 mm between the closest neighbouring perforations (corresponding to 2 500 perforations/m$^2$) is too large to avoid surface craters with dimensions which require downgrading of substantial amounts of the finished product.

From the results compiled in FIG. 2 it is concluded that the "6/10/10" coded material (10 000 perforations/m$^2$ in the perforated area) is the preferred variant of all samples tested.

Example 8

Impact of the Shape and the Size of Perforations on the Mechanical Properties of Perforated Collagen Films The performance of a collagen film on the Coffi-A applicator (see example 2), its mechanical strength and the extensibility were determined as a function of the size and the shape of the perforations. Samples with essentially circular perforations were manufactured as described in the examples above. Samples "ov1" and "ov2" with oval holes were manufactured by programming the relevant laser parameters as follows:

|  | Sample "ov1" | Sample "ov2" |
| --- | --- | --- |
| power: | 10% | 35% |
| puls frequency: | 0.6 kHz | 1.0 kHz |
| Galvo speed: | 4800 mm/s | 6000 mm/s |
| wpa (draw line to): | "x = 4; y = 160" | "x = 4; y = 160" |
| gpa (go inactive to): | "x = −4; y = 160" | "x = −4; y = 160" |
| delay 1 (ms): | 1 | 90 |
| wpa (draw line to): | "x = 4; y = −160" | "x = 4; y = −160" |
| gpa (go inactive to): | "x = −4; y = −160" | "x = −4; y = −160" |
| delay 2 (ms): | 1 | 90 |

The long axis of the oval perforations thus obtained showed in transverse direction. The spacing between the individual perforations obeyed the scheme "10/10".

The ellipticity of oval-shaped perforations was defined as the difference between the length of the equatorial and polar semi-diameters, divided by the length of the equatorial diameter of the approximately elliptic perforation. The ellipticity of the oval perforations prepared was found to be 0.17 for sample "ov1" and 0.31 for sample "ov2". The average length of the long (equatorial) axis of the oval perforations found in sample "ov1" was 970 μm, the one found for sample "ov2" was 1600 μm. The length of their short (polar) axis was 645 μm (sample "ov1") and 600 μm (sample "ov2").

100 m rolls of the resulting collagen films were loaded on the Naturin Coffi-A applicator to mimic industrial application. All films with essentially circular perforations passed the test without tearing. The 100 m roll of sample "ov1" tore 3 times, that of sample "ov2" tore frequently. In the applicator test only material which does not show any breakage is considered acceptable.

Dumb-bell shaped pieces of the individual samples were cut from the films both in machine direction and in transverse direction. Tensile strength and extensibility were measured as described in example 2. The results obtained are presented in FIGS. 12 and 13.

For two reasons the tensile strength in machine direction of the samples is slightly reduced compared to the tensile strength in transverse direction: on one hand, the control film already shows this feature and, on the other hand, the perforations are not perfectly circular: they show ellipticities between 0.02 and 0.05 (the sample coded "8/10/10" shows an even more pronounced ellipticity of 0.10), with the equatorial axis of the ellipse being parallel to the transverse direction.

Figure 12:
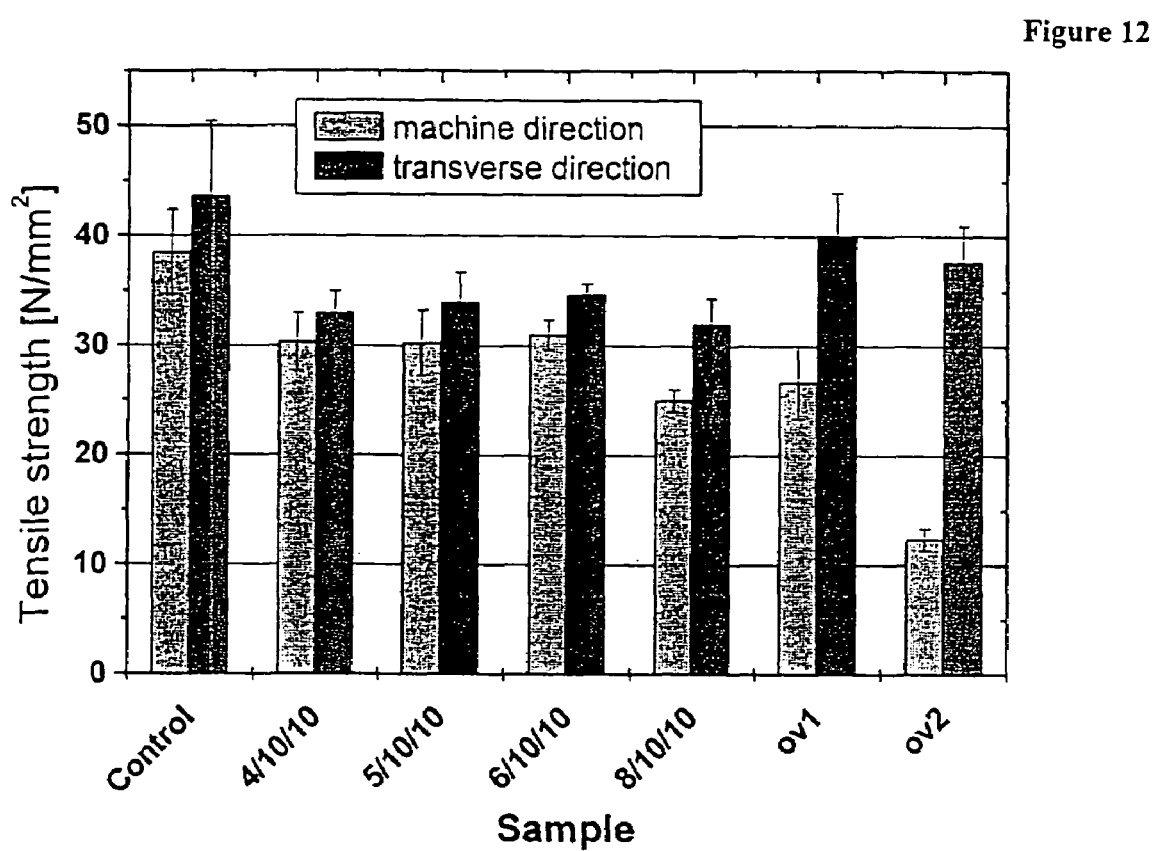
FIG. 12.

It is conspicuous, that the tensile strength in transverse direction of the samples with the oval perforations ("ov1" and "ov2") is higher than the corresponding strength of the samples coded "4/10/10" through "8/10/10" (FIG. 12). It is particularly amazing to observe that the tensile strength in transverse direction of sample "ov2" (average size of the individual oval perforations: 753 600 μm$^2$) is significantly higher than that of the sample coded "4/10/10" with its essentially circular perforations (average size of the individual perforations: 125 600 μm$^2$). This observation is another hint that the mere size of the individual perforations does not predominantly determine the mechanical properties of a perforated collagen film.

Figure 13:
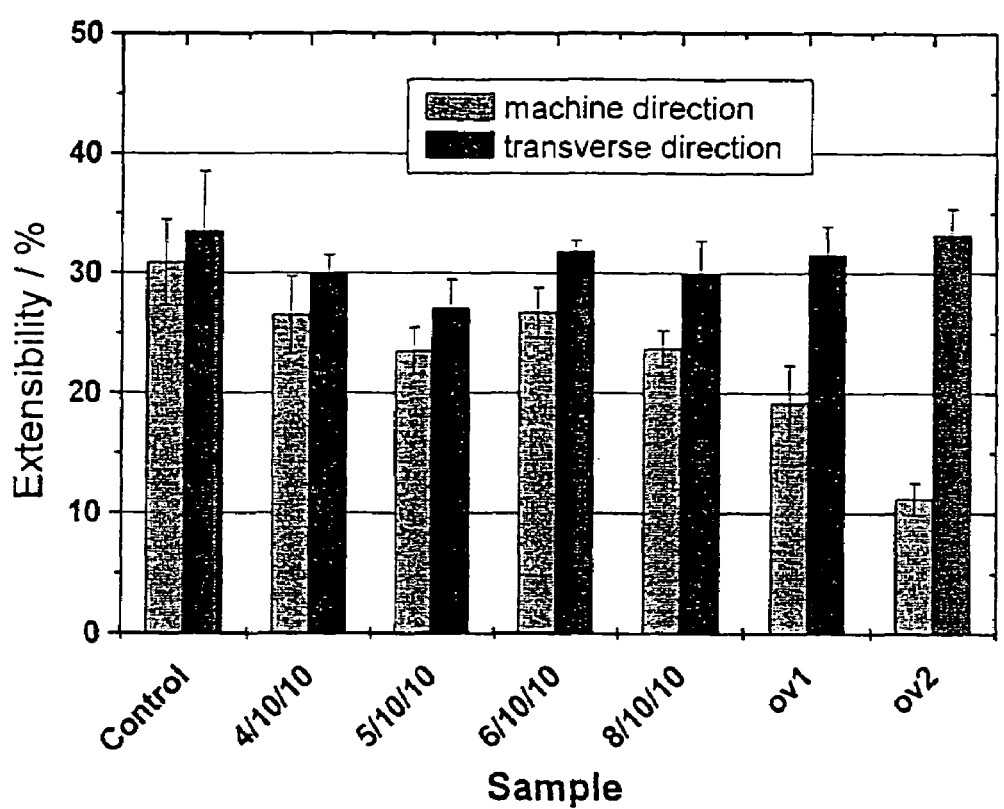
FIG. 13.

It was impressive to learn instead, that it is not the size of the perforations which has the deepest impact, but that it is the shape of the perforations which predominantly determines the mechanical properties of a perforated film. FIG. 13, for example, shows the extensibility of the films both in machine and in transverse direction. The extensibility in transverse direction of all samples is basically in the same level, with some fluctuation, regardless of the size of the perforations. The extensibility values in machine direction of the samples coded "4/10/10", "5/10/10", "6/10/10" and "8/10/10", show some more fluctuation, but may still be considered as being in one level. This observation supports the finding again, that, in a first approximation, the size of the perforations is not that critical with respect to the mechanical performance of a perforated collagen film, at least in the diameter range under consideration. However, a clear drop of extensibility in machine direction is observed when going from the samples with basically circular perforations to the samples with perforations having pronounced ellipicities. Though the average size of the perforations of sample ov1 (value determined under the microscope: 491 000 μm$^2$) is almost identical to that of sample "8/10/10" (502 400 μm$^2$), the extensibility in machine direction of sample ov1 drops below 20%, which in the past has been found to be insufficient (U.S. Pat. No. 5,885,634), and the results of the test on the Coffi-A applicator mimicking industrial application confirm this finding (see above).

Thus, laboratory findings are also reflected by the film performance in practice-related tests. Therefore, it is concluded, that surprisingly the utility of a perforated collagen film is much more dominated by the shape of the individual perforations, (expressed in terms of "ellipticity"), than by the size of the individual perforations.

Example 9

Manufacture and Test of Perforated Collagen Films with Lower Basis Weight

Figure 14:
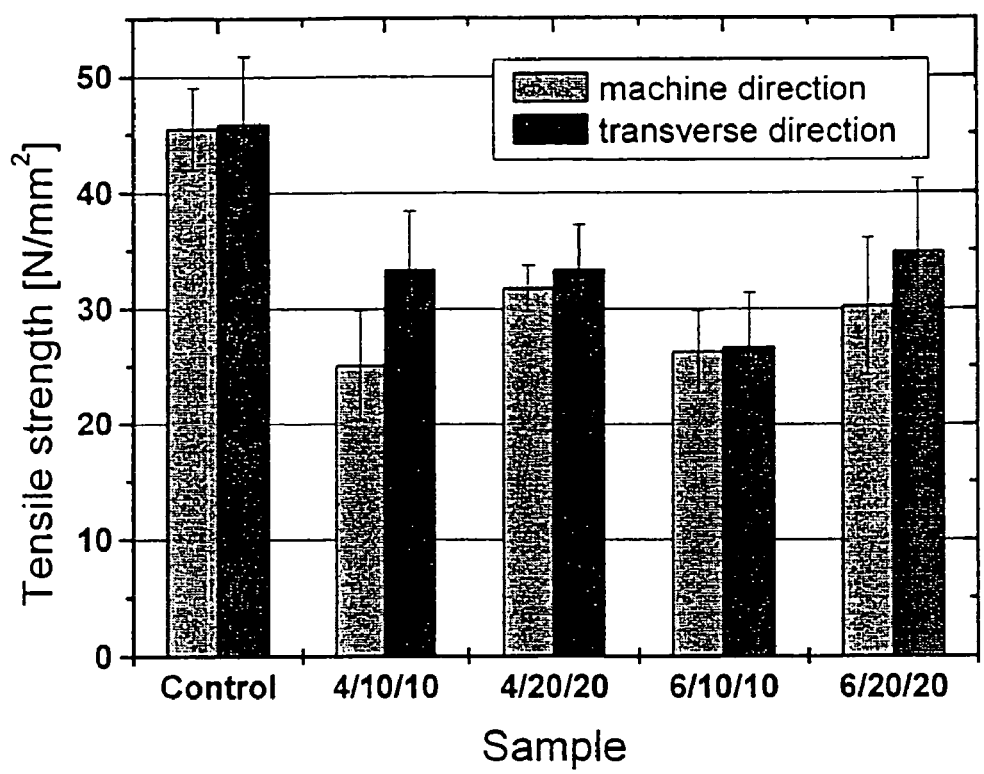
FIG. 14.
Figure 15:
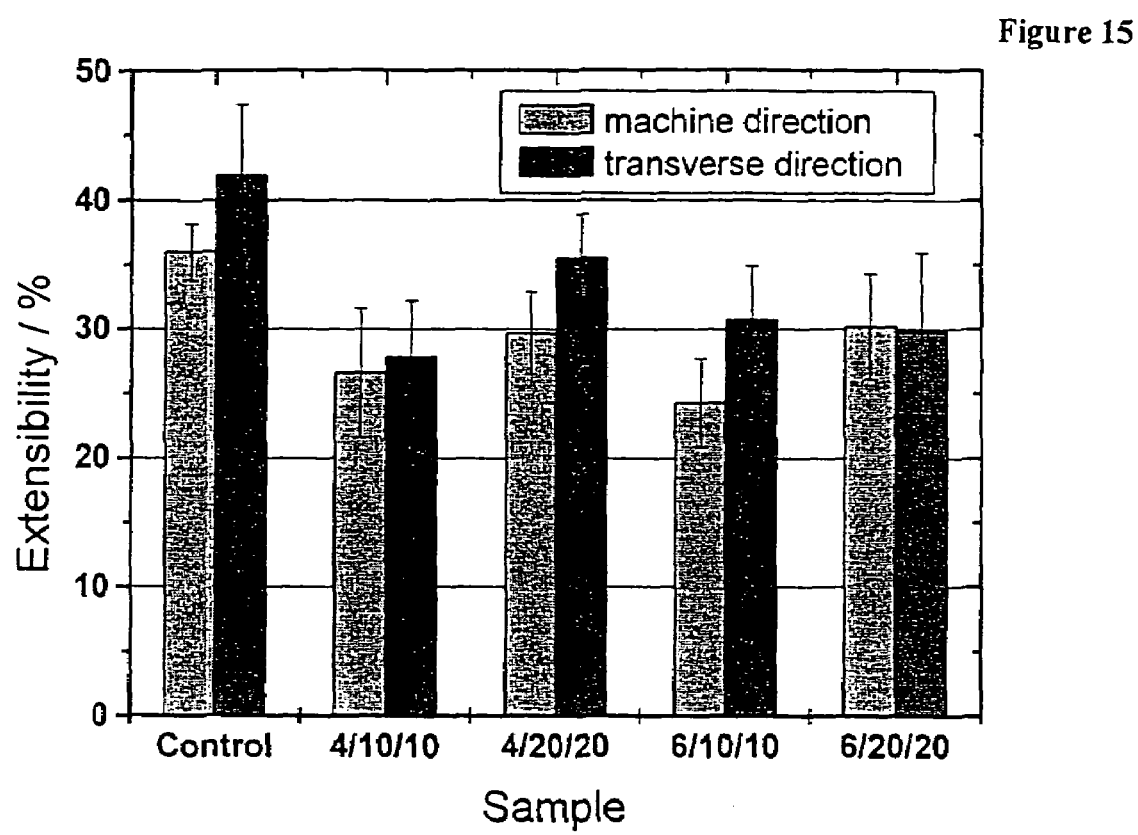
FIG. 15.

A sample of a collagen film with low basis weight was perforated similar to the way described in example 1. The sample had the same composition like the one described in example 1, but its basis weight was only of 23.9 g/m². The perforation arrangements followed the schemes "4/10/10", "4/20/20", "6/10/10", and "6/20/20". Tensile strength and extensibility of the resulting products were measured following the method described in example 2. The results are presented in FIGS. 14 and 15.

The data for the tensile strength and the extensibility of the individual thin-walled samples are not extraordinarily lower than those obtained from the corresponding perforated sample based on a standard basis weight of about 30 g/m². This points to the fact that, if required by the market, it should be possible to supply perforated collagen films with basis weights as low as 20 g/m².

Example 10

Figure 16:
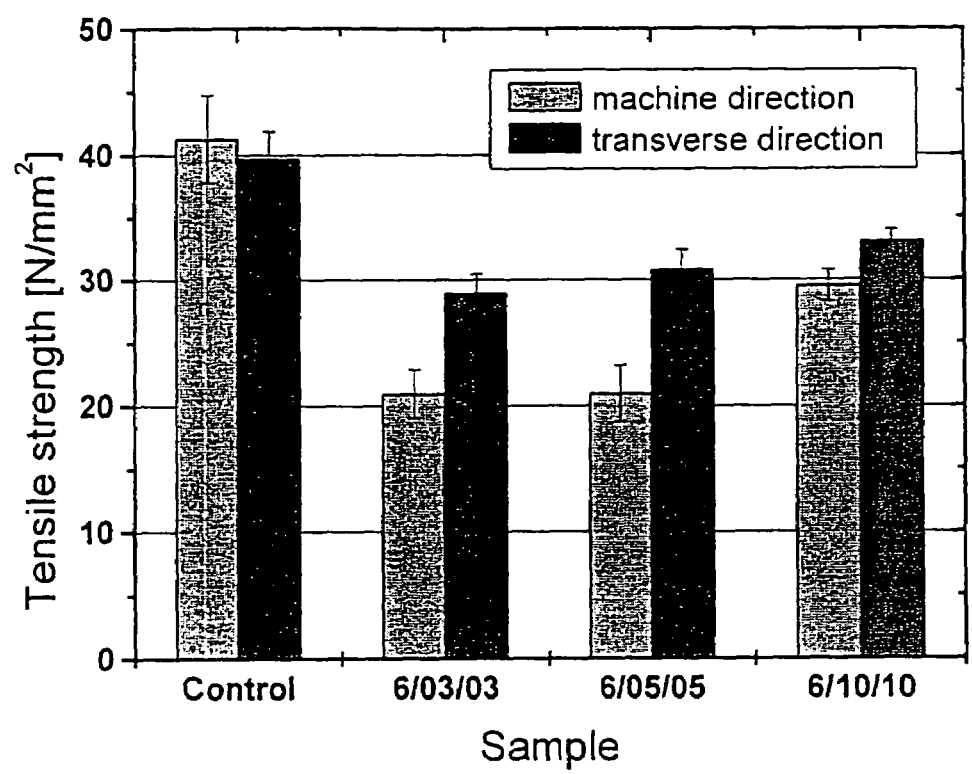
FIG. 16.
Figure 17:
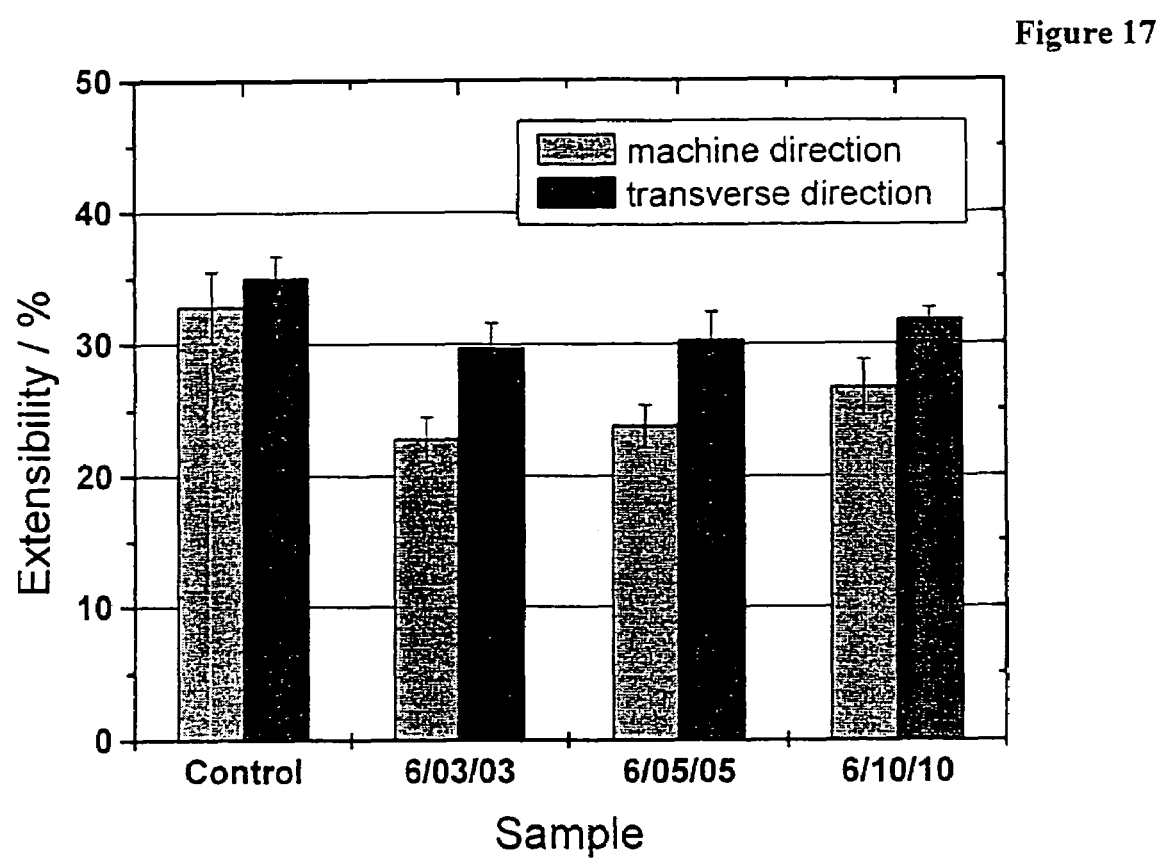
FIG. 17.

Preparation and Test of Perforated Collagen Films Having Very Low Distances Between the Individual Perforations Two samples of a 47 cm wide standard Naturin Collagen Food Film (Coffi®) film were perforated similar to the way described in example 1, however the perforation density was increased drastically. The perforation arrangements followed the schemes "6/05/05" (corresponding to 40 000 perforations/m² in the perforated area), and "6/03/03" (98 898 perforations/m²). Tensile strength and extensibility of the resulting products as well as those of the control film and a "6/10/10"—type perforated sample (10 000 perforations/m²) were measured following the method described in example 2. The results are presented in FIGS. 16 and 17.

The influence of the perforation density on the mechanical parameters of the collagen film is clearly shown.

The pronounced differences between the tensile strength in machine and transverse direction measured for the samples with high perforation densities suggest that in case of high perforation density the presence of "micro ellipticity" of the perforations becomes more effective with respect to the mechanical properties of the film than in case of lower perforation density.

The resulting material with high perforation density was then loaded on the applicator to mimic industrial application. Unexpectedly, both the "6/05/05" and the "6/03/03" coded sample rolls passed the test without tearing. This finding was particularly surprising in the face of the teachings of EP 0 711 321 which avoids distances between individual perforations of less than 16 mm in transverse and less than 20 mm in machine direction.

The tensile strength in machine direction measured for the sample coded "6/03/03" (21 N/mm²) was the lowest one measured in the course of this study. Still, the corresponding film sample passed the applicator test. From this fact it was concluded that the mechanical resistance corresponding to a tensile strength of 21 N/mm² will generally be enough to comply with requirements from practice.

Example 11

Application of Perforated Collagen Sheets in Ham Manufacture

Sheets (57 cm×50 cm) of perforated collagen film were obtained by cutting slips with a length of 50 cm from a 100 m roll of 57 cm wide perforated collagen film (perforation code "6/10/10"; sample perforated according to example 4), using specific cutting equipment. Cooked hams were manufactured by proceeding as follows:

The sheet was extended on the operating table. Two pieces of porcine meat (part of leg and top round), pumped with 30% of brine (based on meat weight) were placed into the centre of the area formed by the film and the film was wrapped round the meat. The wrapped meat was manually passed through the wide opening of a net applicator (THP 100, Schaub Maschinenfabrik, Hamburg) equipped with the net (Avo 28/3 times reinforced). The wrapped meat was then pushed into the net expanded by the net applicator. Once the wrapped meat was completely enclosed by the net, the net was cut and the two open ends of the netted product were closed by means of a manual clipper. The filled netted product was then plumped to adopt an ovoid shape. No manual puncturing was carried out. Without prior degassing, the intermediate product thus prepared was finally cooked and smoked to yield a netted ham with a weight corresponding to a mass of about 3.5 kg. After de-netting, the surface of the ham was inspected for surface craters resulting from air and/or steam trapped between the film and the meat.

10 hams were manufactured using non-perforated sheets ("products N") and 50 hams were produced using sheets of the perforated collagen film ("products P"). 7 out of the 10 "products N" showed unacceptable surface craters with diameters up to 4 cm. 3 out of the 50 "products P" showed minor surface craters with diameters <5 mm, which would not lead to downgrading.

The invention claimed is:

1. A method of perforating a flat film based on collagen provided on rolls or in the form of sheets, for use as a food wrapping in food industry, comprising using a laser to form perforations of substantially circular shape with an average ellipticity of less than 0.17 and the holes being spaced with respect to their nearest neighbors by 3 mm to 14 mm, thus allowing the escape of air or steam trapped between the film and the food wrapped into said film, and said film still having sufficient mechanical strength and extensibility to be able to stand the food processing steps in the manufacture of cooked ham or in comparable operations under industrial conditions.

2. A method of perforating a flat film based on collagen according to claim 1, comprising the use of $CO_2$-Laser.

3. A method of perforating a flat film based on collagen according to claim 1, comprising performing adjustments such that the resulting perforations have an average ellipticity of less than 0.17.

4. A method of perforating a flat film based on collagen according to claim 1, comprising performing adjustments adjusting the experimental set-up such that the perforation process provides either perfectly circular perforations having average diameters higher than 300 µm and equal or lower than 800 µm and/or perforations deviating from perfectly circular shape having, in average, longest diameters between more than 300 μm and less than 800 μm.

5. A method of perforating a flat film based on collagen according to claim 1, comprising performing adjustments such that the perforation process provides irregularly arranged perforations.

6. A method of perforating a flat film based on collagen according to claim 1, comprising executing said perforation in a continuous way.

* * * * *